United States Patent
Brun et al.

(10) Patent No.: US 9,690,772 B2
(45) Date of Patent: Jun. 27, 2017

(54) CATEGORY AND TERM POLARITY MUTUAL ANNOTATION FOR ASPECT-BASED SENTIMENT ANALYSIS

(71) Applicant: Xerox Corporation, Norwalk, CT (US)

(72) Inventors: Caroline Brun, Grenoble (FR); Diana Nicoleta Popa, Grenoble (FR); Claude Roux, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 224 days.

(21) Appl. No.: 14/569,899

(22) Filed: Dec. 15, 2014

(65) Prior Publication Data

US 2016/0171386 A1    Jun. 16, 2016

(51) Int. Cl.
G06F 15/18    (2006.01)
G06F 17/27    (2006.01)
G06N 99/00    (2010.01)
G06K 9/62    (2006.01)

(52) U.S. Cl.
CPC ........ *G06F 17/271* (2013.01); *G06F 17/2785* (2013.01); *G06K 9/628* (2013.01); *G06N 99/005* (2013.01)

(58) Field of Classification Search
USPC .......................................................... 706/12
See application file for complete search history.

(56) References Cited

U.S. PATENT DOCUMENTS

| | | | |
|---|---|---|---|
| 6,243,669 B1 | 6/2001 | Horiguchi et al. | |
| 7,698,129 B2 | 4/2010 | Adachi et al. | |
| 8,041,669 B2 | 10/2011 | Nigam et al. | |
| 8,086,557 B2 | 12/2011 | Ait-Mokhtar et al. | |
| 8,280,885 B2 | 10/2012 | Cardie et al. | |
| 8,478,582 B2 | 7/2013 | Habu et al. | |
| 8,532,981 B2* | 9/2013 | Brun | G06F 17/2735 704/10 |
| 8,533,208 B2 | 9/2013 | Sundaresan et al. | |
| 8,645,395 B2 | 2/2014 | Mushtaq et al. | |
| 8,650,023 B2* | 2/2014 | Brun | G06F 17/2745 704/1 |
| 8,738,363 B2* | 5/2014 | Brun | G06F 17/271 704/10 |
| 9,390,087 B1* | 7/2016 | Roux | G06F 17/2881 |
| 2007/0255553 A1 | 11/2007 | Nomoto | |

(Continued)

OTHER PUBLICATIONS

Medhat et al., "Sentiment analysis algorithms and applications: A survey", May 27, 2014.*

(Continued)

*Primary Examiner* — Michael B Holmes
(74) *Attorney, Agent, or Firm* — Kermit D. Lopez; Luis M. Ortiz; Ortiz & Lopez, PLLC

(57) ABSTRACT

Systems and methods for aspect-based opinion mining including identifying the polarity (e.g., positive, negative, etc.) of different features of a product or a service as expressed in a text. This general task can be divided into four sub-tasks: identifying the aspect terms, classifying them into one of a set of predefined aspect categories, and identifying the polarity of the aspects terms and the aspect categories. A combination of systems (e.g., rule-based and machine learning based) can be employed to implement aspect category and aspect term polarity mutual annotation for aspect-based sentiment analysis.

20 Claims, 4 Drawing Sheets

(56) References Cited

U.S. PATENT DOCUMENTS

| | | | |
|---|---|---|---|
| 2011/0099052 A1* | 4/2011 | Brun | G06F 17/2211 705/7.38 |
| 2012/0245923 A1* | 9/2012 | Brun | G06F 17/2735 704/9 |
| 2012/0245924 A1* | 9/2012 | Brun | G06F 17/2765 704/9 |
| 2013/0096909 A1* | 4/2013 | Brun | G06F 17/271 704/9 |
| 2014/0067370 A1* | 3/2014 | Brun | G06F 17/271 704/9 |
| 2015/0120788 A1* | 4/2015 | Brun | G06F 17/30312 707/812 |
| 2016/0171386 A1* | 6/2016 | Brun | G06F 17/2785 706/12 |

OTHER PUBLICATIONS

Syntactic Model for Russian: Deep Learning Models with Dependency Parsing Scheme Alexandr Sboev; Roman Rybka; Dmitry Gudovskikh; Ivan Moloshnikov; Anton Selivanov; Igor Ivanov 2016 International Conference on Computational Science and Computational Intelligence (CSCI) Yr: 2016 pp. 541-544, DOI: 10.1109/CSCI.2016.0108 IEEE Conference Publications.*

A hybrid method for bilingual text sentiment classification based on deep learning Guolong Liu; Xiaofei Xu; Bailong Deng; Siding Chen; Li Li 2016 17th IEEE/ACIS International Conference on Software Engineering, Artificial Intelligence, Networking and Parallel/Distributed Computing (SNPD) Yr: 2016 pp. 93-98, DOI: 10.1109/SNPD.2016.7515884 IEEE.*

A novel deep learning architecture for sentiment classification Rahul Ghosh; Kumar Ravi; Vadlamani Ravi 2016 3rd International Conference on Recent Advances in Information Technology (RAIT) Year: 2016 pp. 511-516, DOI: 10.1109/RAIT.2016.7507953 IEEE Conference Publications.*

A study of sentiment analysis using deep learning techniques on Thai Twitter data Peerapon Vateekul; Thanabhat Koomsubha 2016 13th International Joint Conference on Computer Science and Software Engineering (JCSSE) Year: 2016 pp. 1-6, DOI: 10.1109/JCSSE.2016.7748849 IEEE Conference Publications.*

Ait-Mokhtar, S. et al., "Robustness beyond Shallowness: Incremental Deep Parsing," Natural Language Engineering (2002) 8(2/3):121-144.

Brun, C., "Detecting Opinions Using Deep Syntactic Analysis," Recent Advances in Natural Language Processing, RANLP Sep. 12-14, 2011, Hissar, Bulgaria, 7 pages.

Fan, R.-E. et al., "LIBLINEAR: A Library for Large Linear Classification," Journal of Machine Learning Research (2008) 9:1871-1874.

Ganu, G. et al., "Beyond the Stars: Improving Rating Predictions using Review Text Content," Twelfth International Workshop on the Web and Databases (WebDB 2009) Jun. 28, Providence, Rhode Island, pp. 1-6.

Hu, M. et al., "Mining and Summarizing Customer Reviews," KDD '04, Aug. 22-25. Seattle, Washington, 10 pages.

Joachims, T., "Making Large-Scale SVM Learning Practical," Advances in Kernel Methods—Support Vector Learning (1999) Schölkopf, B. et al., (eds.) MIT Press, Cambridge, MA, pp. 41-56.

Pontiki, M. et al., "SemEval-2014 Task 4: Aspect Based Sentiment Analysis," Proceedings of the 8$^{th}$ International Workshop on Semantic Evaluation (SemEval 2014), Dublin, Ireland, Aug. 23-24, pp. 27-35.

* cited by examiner

CATEGORY AND TERM POLARITY MUTUAL ANNOTATION FOR ASPECT-BASED SENTIMENT ANALYSIS

TECHNICAL FIELD

Embodiments are generally related to the field of information mining and in particular, opinion mining. Embodiments are additionally related to the field of aspect-based sentiment analysis. Embodiments are also related to the field of machine learning.

BACKGROUND OF THE INVENTION

Opinion mining refers to a broad area of natural language processing, computational linguistics, and text mining. It aims at determining the attitude of a speaker or a writer with respect to some topic, written in natural language. The target corpora of Opinion Mining applications are social networks, blogs, e-forums (i.e. the blogosphere), that are a breeding ground of topics and opinions. Opinion mining has many applications related to business analytics, as companies, organizations and government agencies increasingly require new tools to detect customer's opinion about their products and/or services.

A difficult and related aspect of opinion mining involves problems associated with aspect-based sentiment analysis. The basic idea behind aspect based sentiment mining is the ability to determine sentiments or opinions that are expressed regarding different features or aspects of entities. When a text is classified at a document level or a sentence level, the resulting classification might not provide meaningful data concerning what the opinion holder likes or dislikes. If a document is positive on an object, for example, this clearly does not mean that the opinion holder will hold positive opinions about all the aspects or features of the object. Similarly, if a document is negative it does not mean that the opinion holder will dislike everything about the object described.

For example, consider the following sentence extracted from a restaurant review: "Pizza and garlic knots are great also and the delivery is super quick also." Aspect based opinion mining should detect from the two food-related terms (the aspect terms: Pizza, garlic knot) that are positively commented that one aspect category of the sentence is food with positive polarity, and also, from the positively commented service-related term (the aspect term: delivery) that the other aspect category is service also with positive polarity. So basically the task involves detecting relevant aspect terms; detecting the polarity of these terms; detecting relevant aspect categories; and detecting the polarity of these categories.

Some systems have been implemented, which combine the use of a sentiment detection module based on deep syntactic parsing with machine learning classification components of a standard classification library. For example, a preliminary system aimed at performing aspect-based opinion mining has been developed. Such an opinion extraction system has been designed on top of a robust syntactic parser, which is used as a fundamental component of our system, in order to extract deep syntactic dependencies, which are an intermediary step of the extraction of semantic relations of opinion. Such a system uses a polar lexicon combined with syntactic dependencies extracted by the parser into opinion relation extraction rules.

Syntactic relations already extracted by a general dependency grammar, lexical information about word polarities, sub-categorization information, and syntactic dependencies are all combined within our robust parser to extract the semantic relations. The polarity lexicon has been built using existing resources and also by applying classification techniques over large corpora, while the semantic extraction rules are handcrafted for the complete description of these different components. The system outputs a semantic dependency called SENTIMENT which can be binary, i.e. linking opinionated terms and their targets, or unary, i.e. just the polar term in case the target of the opinion hasn't been detected. For example, when parsing "I was highly disappointed by their service and food.", the systems outputs the following dependencies:

SUBJ-N(disappointed,food)
SUBJ-N(disappointed,service)
OBJ-N(disappointed,I)
MANNER-PRE(disappointed,highly)
SENTIMENT_NEGATIVE(disappointed,service)
SENTIMENT_NEGATIVE(disappointed,food)

In this system, aspects terms are not explicitly extracted; however, all non-polar arguments of the SENTIMENT dependency are potential aspect terms. Moreover, this system considers only positive and negative opinions, but does not cover the neutral and conflict polarities.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved opinion mining methods and systems.

It is another aspect of the disclosed embodiments to provide for a unique and novel framework for aspect-based opinion mining.

It is yet another aspect of the disclosed embodiments to provide for methods and systems for employing mutual information from both aspect terms and aspect categories to detect and improve their respective annotations in the context of a framework that integrates a rule-based system with machine learning techniques.

It is a further aspect of the disclosed embodiments to use the inheritance of polarity from a category with respect to undecided aspect terms.

The aforementioned aspects and other objectives and advantages can now be achieved as described herein. Systems and methods are disclosed for aspect-based opinion mining including identifying the polarity (positive, negative, etc.) of different features of a product or a service as expressed in a text. This general task can be divided into four sub-tasks: identifying the aspect terms, classifying them into one of a set of predefined categories, and identifying the polarity of the aspects terms and categories. A combination of systems (e.g., rule-based and machine learning based) can be employed to implement category and term polarity mutual annotation for aspect-based sentiment analysis.

In one embodiment, a system can be implemented for aspect-based sentiment analysis for opinion mining. Such a system can include a sentiment detection module (e.g., a syntactic parsing component) based on deep syntactic parsing, and a group of machine learning classification components that communicate with the sentiment detection module and which process data provided by the sentiment detection module to determine sentiments expressed with respect to varying aspects of a domain. The sentiment detection module generally constitutes a syntactic parsing component that detects relevant terms and categories with respect to a domain. The machine learning classification components can include, for example, a sentence classification module that associates aspect categories to sentences, a sentiment grammar component to associate polarities to terms and categories detected by the sentiment detection module, a classification module that associates polarities to aspect categories detected by the sentence classification module, and a polarity correction module that corrects polarities of aspect terms using data indicative of category polarity classification. The sentiment detection module can be implemented as an RBS (Rule-Based System) that detects fine-grained information.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
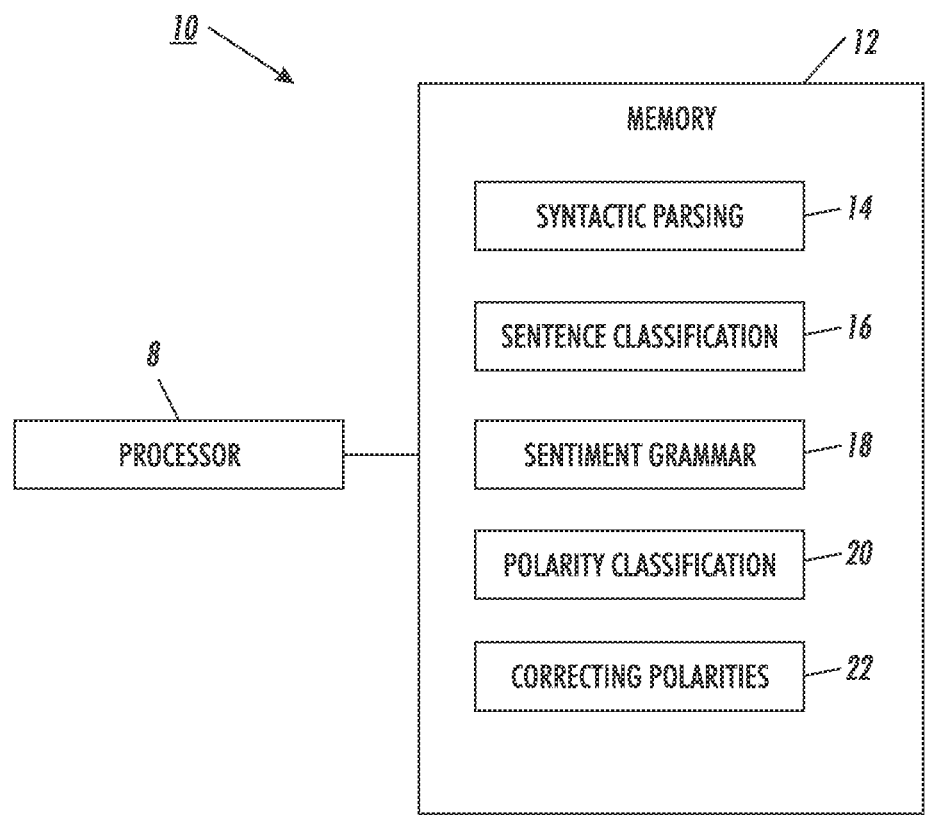
FIG. 1 illustrates a block diagram of a system for category and term polarity mutual annotation for aspect based sentiment analysis, in accordance with a preferred embodiment.

The particular values and configurations discussed in these non-limiting examples can be varied and are cited merely to illustrate at least one embodiment and are not intended to limit the scope thereof.

The disclosed embodiments address aspect-based opinion mining, i.e. identifying the polarity (e.g., positive, negative, etc.) of different features of a product or a service as expressed in a text. This general task can be divided into 4 sub-tasks: identifying the aspect terms, classifying them into one of a set of predefined categories, and identifying the polarity of the aspects and the categories. A combination of systems (rule-based and machine learning based) is used.

An evaluation with respect to some experimental embodiments was performed using the SemEval 14 competition dataset, and shows very competitive results. A unique feature of the disclosed embodiments lies in using the inheritance of polarity from the category to the undecided aspect terms. As will be explained in greater detail herein, the disclosed approach is very effective on the evaluated dataset, showing a significant boost in results.

Before proceeding with a detailed discussion of the disclosed embodiments, it is important to appreciate that aspect based sentiment analysis generally includes the following four subtasks: aspect term extraction, aspect term polarity, aspect category detection, and aspect category polarity.

Regarding aspect term extraction, given a set of sentences with pre-identified entities (e.g., restaurants), the aspect terms present in the sentence should be identified and a list returned containing all distinct aspect terms. An aspect term names a particular aspect of the target entity. For example, "I liked the service and the staff, but not the food", "The food was nothing much, but I loved the staff". Multi-word aspect terms (e.g., "hard disk") should be treated as single terms (e.g., in "The hard disk is very noisy" the only aspect term is "hard disk").

Regarding aspect term polarity, for a given set of aspect terms within a sentence, determine whether the polarity of each aspect term is positive, negative, neutral or conflict (i.e., both positive and negative).

For example:
"I loved their fajitas"→{fajitas: positive}
"I hated their fajitas, but their salads were great"→{fajitas: negative, salads: positive}
"The fajitas are their first plate"→{fajitas: neutral}
"The fajitas were great to taste, but not to see"→{fajitas: conflict}

Regarding aspect category detection, given a predefined set of aspect categories (e.g., price, food), the aspect categories discussed in a given sentence should be identified. Aspect categories are typically coarser than the aspect terms of the aspect term extraction operation described above, and do not necessarily occur as terms in the given sentence. For example, given a set of aspect categories {food, service, price, ambience, anecdotes/miscellaneous}:
"The restaurant was too expensive"→{price}
"The restaurant was expensive, but the menu was great"→{price, food}

Regarding aspect category polarity, given a set of pre-identified aspect categories (e.g., {food, price}), an operation should be implemented to determine the polarity (positive, negative, neutral or conflict) of each aspect category. For example:
"The restaurant was too expensive"→{price: negative}
"The restaurant was expensive, but the menu was great"→{price: negative, food: positive}

Note that in one experiment, domain-specific datasets for laptops and restaurants composed of over 6K sentences with fine-grained aspect-level human annotations were provided for training. The laptop corpus is only annotated with aspect terms and not with an aspect category, so it is not relevant to the disclosed embodiments. The restaurant review corpus, however, was used in all the experiments presented and examples discussed herein. It can be appreciated, of course, that reference to the restaurant review corpus is for general illustrative and edification purposes only and is not considered a limiting feature of the disclosed embodiments.

In the restaurant review example, the original dataset included annotations for coarse aspect categories and overall sentence polarities. The dataset can include annotations for aspect terms occurring in the sentences, aspect term polarities, and aspect category-specific polarities. Corrections have been made to some errors (e.g., sentence splitting errors) of the original dataset. Experienced human annotators can be utilized to identify the aspect terms of the sentences and their polarities.

Note that in some embodiments, the sentences, the datasets can be annotated using XML tags. The following example illustrates the format of the annotated sentences of the restaurants dataset.

```xml
<sentence id="813">
  <text>All the appetizers and salads were fabulous, the steak
  was mouthwatering
  and the pasta was delicious!!!</text>
    <aspectTerms>
      <aspectTerm term="appetizers" polarity="positive" from="8"
      to="18"/>
      <aspectTerm term="salads" polarity="positive" from="23" to="29"/>
      <aspectTerm term="steak" polarity="positive" from="49" to="54"/>
      <aspectTerm term="pasta" polarity="positive" from="82" to="87"/>
    </aspectTerms>
    <aspectCategories>
      <aspectCategory category="food" polarity="positive"/>
    </aspectCategories>
</sentence>
```

The possible values of the polarity field are: "positive", "negative", "conflict", "neutral". The possible values of the category field are: "food", "service", "price", "ambience", "anecdotes/miscellaneous". The disclosed embodiments can be therefore implemented to tackle the four tasks, as described below.

FIG. 1 illustrates a block diagram of a system 10 for category and term polarity mutual annotation for aspect based sentiment analysis, in accordance with a preferred embodiment. System 10 generally includes a processor 8 that communicates with a computer memory 12, which stores and maintains a number of modules including a syntactic parsing module 14, a sentence classification module 16, a sentiment grammar component or module 18, a polarity classification module 20, and an additional module 22 for correcting term polarities using category polarity information.

The syntactic parsing component or module 14 can be implemented as a sentiment detection module that includes instructions for detecting relevant aspect terms and aspect categories of the domain addressed (e.g., restaurant reviews based on semantic lexical information encoded within a domain lexicon). The sentence classification module 16 includes instructions for associating aspect categories to sentences (i.e., a given sentence may have different aspect categories). The sentiment grammar module 18 includes instructions for associating polarities to the terms and categories detected by the syntactic parsing module 14. The classification module 20 includes instructions for associating polarities to the aspect categories detected by the sentence classification module 16. A polarity correction module 22 includes instructions for correcting polarities of the aspect terms using the results of the category polarity classification. The syntactic parsing module 14 provides linguistic information that serves as features to the classification modules 16 and 20, which provide the final output.

Figure 2:
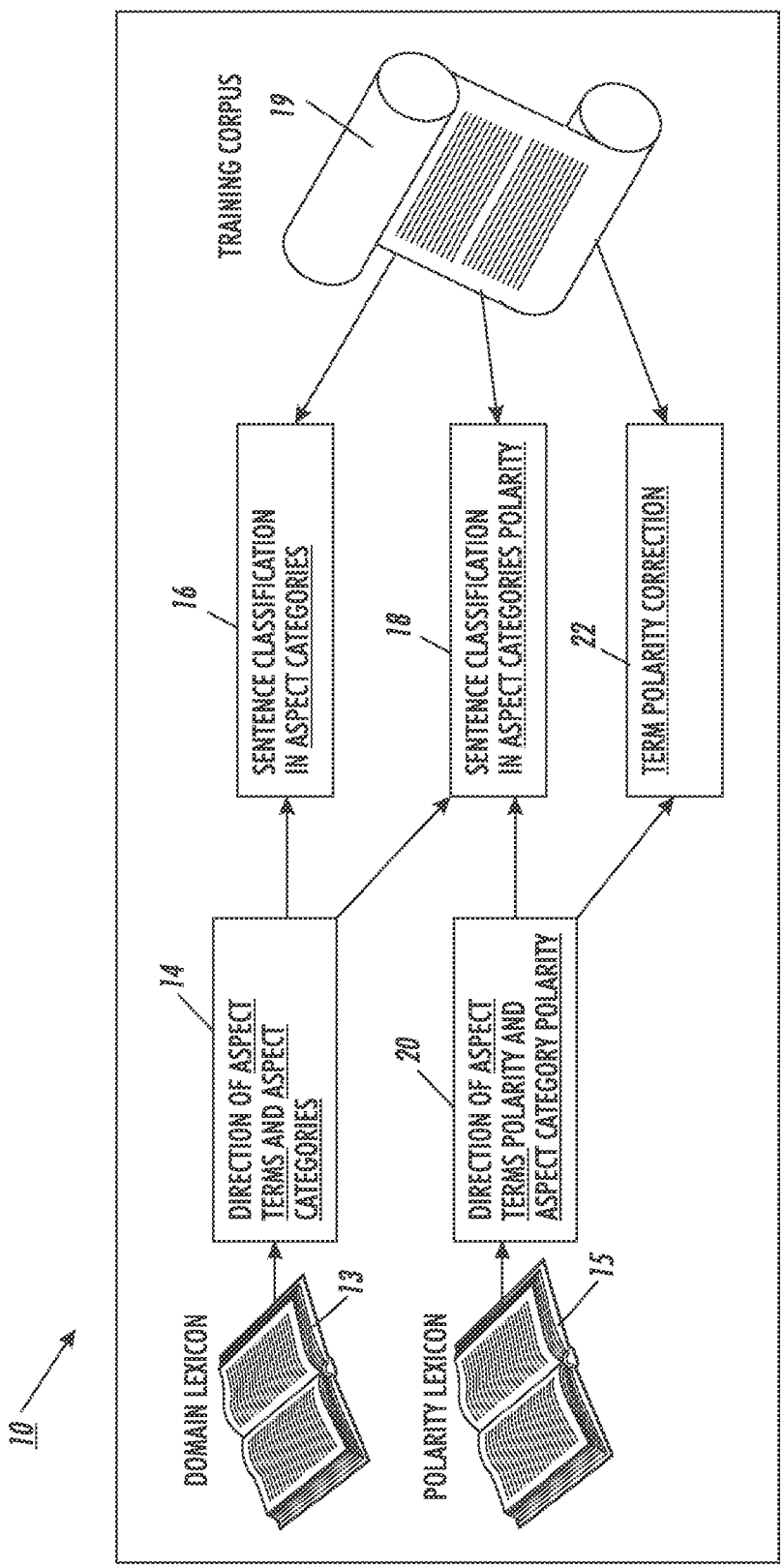
FIG. 2 illustrates a schematic diagram depicting the architecture of a system, in accordance with an alternative embodiment.

FIG. 2 illustrates a schematic depicting the architecture of system 10, in accordance with an alternative embodiment. Note that identical reference numerals illustrated and discussed herein refer generally to the same component or part. As shown in the architectural diagram of system 10 in FIG. 2, the syntactic parsing module 14 detects relevant aspect terms and aspect categories of the domain addressed, in this case domain lexicon 13. The sentence classification module 16 receives data output from the syntactic parsing module 14 and as indicated previously, associates aspect categories to sentences. The classification module 20 is shown in FIG. 2 with respect to the polarity lexicon 15 and module 22 for correcting polarities.

Figure 3:
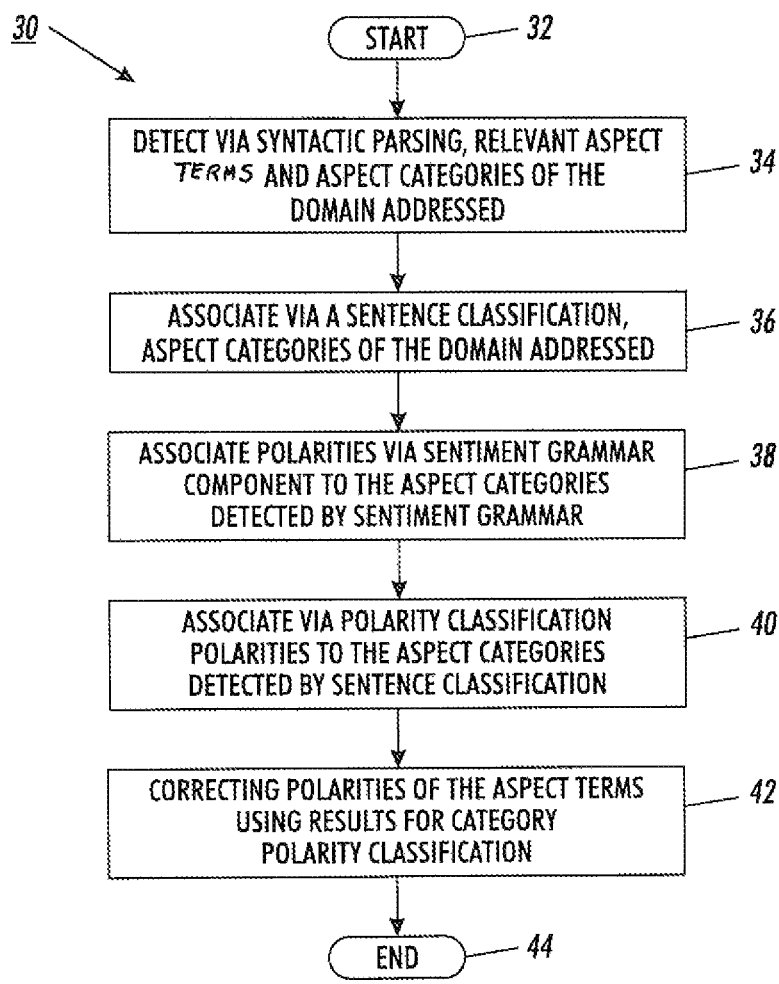
FIG. 3 illustrates a high-level flow chart of operations depicting logical operational steps of a method for category and term polarity mutual annotation for aspect based sentiment analysis, in accordance with a preferred embodiment.

FIG. 3 illustrates a high-level flow chart of operations depicting logical operational steps of a method 30 for category and term polarity mutual annotation for aspect based sentiment analysis, in accordance with a preferred embodiment. It can be appreciated that the steps shown in FIG. 3 may be performed in the particular order shown in FIG. 3, or may be performed in another order. For example, the operation shown at block 38 may be implemented or performed before the operation shown at block 34, and so on.

As indicated at block 32, the process can be initiated. Next, as shown at block 34, a step or logical operation can be implemented to detect relevant aspect terms and aspect categories of the domain addressed via syntactic parsing (e.g., by syntactic parsing component 14). Thereafter, as depicted at block 36, a step or logical operation can be implemented for associating aspect categories to sentences via sentence classification (e.g., by sentence classification module 16).

Next, as shown at block 38, a step or logical operation can be implemented to associate polarities via the sentiment grammar component to the aspect categories detected by the sentiment grammar component. Thereafter, as indicated at block 40, a step or logical operation can be implemented to associate via polarity classification, polarities to the aspect categories detected by sentence classification (e.g., the sentence classification module 16 shown in FIG. 1). As depicted next at block 42, a step or logical operation can be implemented for correcting polarities of the aspect terms using results from category classification. The process can then terminate, as described at block 44.

To detect aspect terms and aspect categories, the disclosed embodiments have adapted the existing lexicons and sentiment grammars to the task and to the domain (e.g., restaurant reviews). Regarding lexicon adaptation, existing systems encode a reasonable amount of polar vocabulary. However, as the task implies domain knowledge to detect the terms, the terms from the training corpus 19 are first extracted and their words encoded into lexicons, assigning to them semantic features such as in the restaurant review example, food, service, ambiance, and price. The list can then be extended with, for example, Wordnet synonyms. To improve coverage, the food term list can be extracted and filtered from, for example, Wikipedia pages (Wikipedia Food Portal) and then encoded.

Regarding grammar adaptation, English grammar, which had been previously developed to detect sentiments, has been adapted in order to detect the terms and the categories, but also the opinions on these terms and categories. The first step was to detect the terms: for this, some local grammar rules (based on regular expressions over syntactic categories) have been developed taking into account the lexical semantic information encoded in the previous step. These rules detect the multi-words terms, e.g., "pastrami sandwiches", group them under the appropriate syntactic category (noun, verb), and associate with them the corresponding lexical semantic feature, food, service, ambiance, price.

Then, a layer of semantic dependencies has been added to the grammar: if a domain term is detected in a sentence, a unary dependency corresponding to its category (FOOD, SERVICE, PRICE, AMBIANCE) is built. If such a term is the second argument of a SENTIMENT relation, 2 dependencies, one for the term (OPINION-ON-TERM) and one for the corresponding category (OPINION-ON-CATEGORY) can be built. They inherit the polarity (positive or negative) of the SENTIMENT dependency. If these dependencies target the same term and category and if they have opposite polarity, they are modified in order to bear the feature "conflict".

Then, if a sentence contains a term and if no SENTIMENT dependency has been detected, the OPINION-ON-TERM and OPINION-ON-CATEGORY are created with the polarity "neutral". Finally, if no terms have been detected in a sentence, there are two cases: (1) a SENTIMENT dependency has been detected somewhere in the sentence, the dependency OPINION-ON-CATEGORY (anecdote/misc.), is created with the corresponding polarity (positive or negative); (2) no SENTIMENT dependency has been detected, the dependency OPINION-ON-CATEGORY (anecdote/misc.), is created with polarity "neutral".

Regarding sentence classification in aspect categories, the sentence classification module 16 can be employed to assign aspect categories to sentences. For each sentence, the module takes as input features the bag of words in the sentence as well as the information provided by the components described in the previous paragraph. The output is generally composed of a list of categories corresponding to each sentence. In the pre-processing stage, stop words are removed (e.g., determinants, conjunctions).

Further, the L2-regularized logistic regression solver from the liblinear library can be employed to train a model. The features considered are the word lemmas from the sentence along with their frequencies (e.g., term frequency). Apart from this, the information provided by the rule based component can also be taken into account to increase the term frequency for terms belonging to the detected categories. Such information can include, for example: dependencies denoting the category a detected aspect term belongs to (e.g., Food, Service, Price, Ambiance) and dependencies denoting the opinions on the detected aspect terms and categories (e.g., OPINION-ON-CATEGORY, OPINION-ON-TERM).

For example, for the following sentence: "Fabulous service, fantastic food, and a chilled out atmosphere and environment", the salient dependencies produced by the syntactic parser are, for example:
FOOD(food), AMBIANCE(atmosphere), SERVICE(service),
AMBIANCE(environment), OPINION-ON-CATEGORY_POSITIVE(food),
OPINION-ON-CATEGORY_POSITIVE(service), OPINION-ON-CATEGORY_POSITIVE(ambiance), OPINION-ON-TERM_POSITIVE(food),
OPINION-ON-TERM-POSITIVE(service), OPINION-ON-TERM_POSITIVE(atmosphere).

This yields the following features having an increase in their frequencies: food (+3), service (+3), atmosphere (+2), environment (+1), and ambiance (+1). Once the logistic regression is performed, each category is predicted with a certain probability. Since in one sentence there may be entities that refer to different categories, we set a threshold with respect to the probability values to be taken into account. We have tried different approaches to set this threshold. The best results on the training and trial data were obtained with a threshold of 0.25, (i.e., we kept only the categories with a probability over 0.25).

Regarding aspect category polarity, the approach to predict the polarity for each category is similar to the one predicting the categories for each sentence, with some differences as will be further detailed. The classification uses for features the bag of words (term frequency), but also the polarity provided by XIP by the following dependencies: OPINION-ON-CATEGORY and SENTIMENT. Whenever these dependencies are detected, a feature is added to the classification of the form polarity category. Thus, for the previous example sentence: "Fabulous service, fantastic food, and a chilled out atmosphere and environment", the additional dependencies considered are:
SENTIMENT_POSITIVE(atmosphere, chilled out),
SENTIMENT_POSITIVE(food, fantastic),
SENTIMENT_POSITIVE(service, Fabulous).

After mapping back the terms to their corresponding categories, the added features are: positive_ambiance, positive_food, and positive_service. Since the dependency OPINION-ON-CATEGORY is also detected by the parser for these categories, each of the above mentioned features will have a frequency of 2 in this case. Moreover, the polarity alone is also added as a feature. The training is performed using the L2-regularized L2-loss support vector classification solver from the same library (liblinear) and a model is generated for each category. Thus, depending on the categories detected within a certain sentence, the corresponding model is used to make the prediction regarding their polarities. The classifier's output represents the predicted polarity for one given category.

Regarding term polarity correction using classification results (e.g., module 22), the initial rule based system deals with negative and positive polarity for terms. Such a rule based system can be configured so that if none of these polarities has been associated to a term, then the terms are associated with the neutral polarity by default. The system is very precise to detect positive and negative terms, but is weaker in terms of recall, because the polarity detection is based on very precise information sometimes difficult to catch by the parser. When no polarity is detected for a given term, the system assigns a neutral polarity to it by default.

Basically, most researchers agree that rule-based systems have a better precision than recall. While, on the other hand, machine learning systems usually offer a much better recall, sometimes to the detriment of precision. The idea here is to reconcile the better of these two worlds. When the rule-based system fails to give an appropriate polarity to a term, we switch to the machine learning module to obtain this polarity. Our system requires two levels of detection. First, we need to detect the category to which the term belongs, in our example, is it a food related term, a service, an ambience, or a price. This information is usually supplied by our grammar. Second, we detect the polarity of this category, which we then use to correct the term polarity. Hence, if the category "food" was detected "positive", thanks to our classifiers, then the terms related to "food", whose polarity could not be figured out by the grammar, are modified accordingly.

The present inventors have performed experiments using an example training corpus referred to as the "SemEval Corpus". The SemEval Corpus can be utilized as, for example, the training corpus 19 shown in FIG. 2 for evaluating a system containing, for example, 800 sentences, 1,134 aspect term occurrences, 1,025 aspect category occurrences, 5 different aspect categories, and 555 distinct aspect terms.

Table A below summarizes results obtained via the aforementioned "SemEval Corpus" in the context of a restaurant corpus with respect to the aspect term and aspect category detection. Note that the systems are compared in terms of best F-Measure.

TABLE A

| Tasks | Method | Precision | Recall | F-measure |
|---|---|---|---|---|
| Term detection | baseline | 0.63 | 0.37 | 0.47 |
| | XRCE | 0.86 | 0.82 | 0.839 |
| | Best | 0.85 | 0.83 | 0.840 |

TABLE A-continued

| Tasks | Method | Precision | Recall | F-measure |
| --- | --- | --- | --- | --- |
| Category detection | baseline | 0.64 | 0.48 | 0.55 |
| | XRCE | 0.83 | 0.81 | 0.82 |
| | Best | 0.91 | 0.86 | 0.88 |

For the detection of the polarity of both terms and categories, we performed different experiments: first we applied our system as it was developed (E1), then we applied the aspect term polarity correction described in section 3.2.5 (E2), which corresponds to our SemEval submission, and finally we optimized the weights of the opinion and sentiment dependencies in the feature vectors and combine it with term polarity correction (E3), this was done after the competition. The following table summarizes the results obtained for polarity detection for the different experiments together with a SemEval baseline and best system (in term of accuracy).

TABLE B

| Method | Term Polarity Accuracy | Category Polarity Accuracy | Comment |
| --- | --- | --- | --- |
| Baseline | 0.58 | 0.59 | |
| XRCE - E1 | 0.66 | 0.78 | |
| XRCE - E2 | 0.78 | 0.78 | SemEval |
| XRCE - E3 | 0.82 | 0.79 | Post-SemEval |
| Best System | 0.81 | 0.83 | SemEval |

Here again the results are quite competitive and the system rank $2^{nd}$ on average on polarity association. Comparing E1 and E2, the results demonstrate that the terms polarity correction module achieves a great improvement for term polarity detection. Comparing E3 and the SemEval best system demonstrates that a term polarity correction combined optimized feature weights would have provided the best results for term polarity.

As can be appreciated by one skilled in the art, embodiments can be implemented in the context of a method, data processing system, or computer program product. Accordingly, embodiments may take the form of an entire hardware embodiment, an entire software embodiment or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., Wi-Fi, Wimax, 802.xx, and cellular network or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 4:
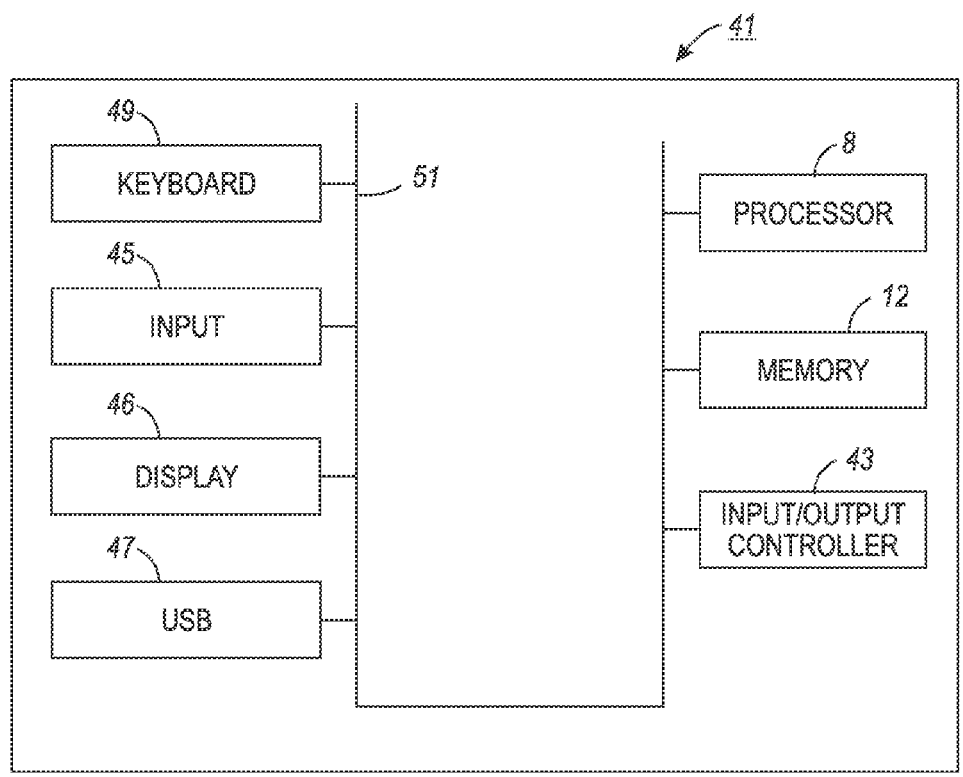
FIG. 4 illustrates a schematic view of a computer system, in accordance with an embodiment.
Figure 5:
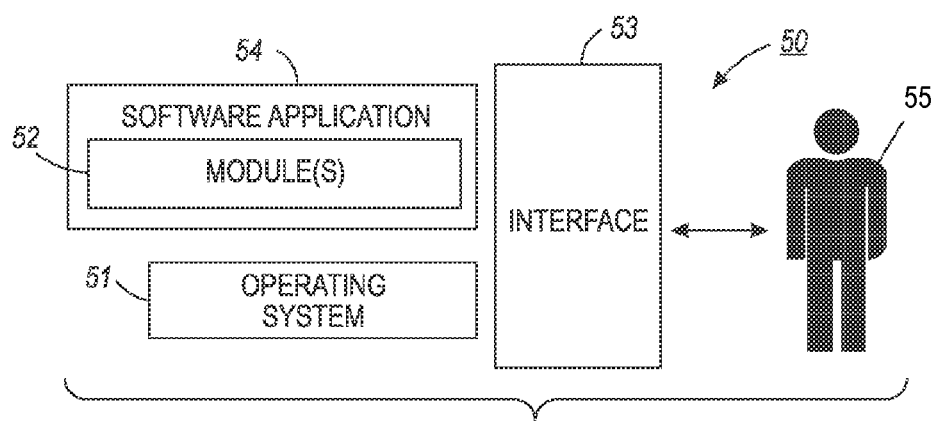
FIG. 5 illustrates a schematic view of a software system including a module, an operating system, and a user interface, in accordance with an embodiment.

FIGS. 4-5 are provided as exemplary diagrams of data-processing environments in which embodiments of the present invention may be implemented. It should be appreciated that FIGS. 4-5 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 4, some embodiments may be implemented in the context of a data-processing system 41 that can include, for example, a processor 8, a memory 12, an input/output controller 43, a keyboard 49, an input device 45 (e.g., a pointing device, such as a mouse, track ball, and pen device, etc.), a display 46, and peripheral connection 47 (e.g., USB—Universal Serial Bus). As illustrated, the various components of data-processing system 41 can communicate electronically through a system bus 51 or similar architecture. The system bus 51 may be, for example, a subsystem that transfers data between, for example, computer components within data-processing system 41 or to and from other data-processing devices, components, computers, etc. Data-processing system 41 may be implemented as, for example, a server in a client-server based network (e.g., the Internet) or can be implemented in the context of a client and a server (i.e., where aspects are practiced on the client and the server). Data-processing system 41 may be, for example, a standalone desktop computer, a laptop computer, a Smartphone, a pad computing device, and so on.

FIG. 5 illustrates a computer software system 50 for directing the operation of the data-processing system 41 depicted in FIG. 4. Software application 54, stored for example in memory 12, generally includes a kernel or operating system 51 and a shell or interface 53. One or more application programs, such as software application 54, may be "loaded" (i.e., transferred from, for example, a mass storage or other memory location into the memory 12) for execution by the data-processing system 41. The data-processing system 41 can receive user commands and data from a user 55 through an interface 53; these inputs may then be acted upon by the data-processing system 41 in accordance with instructions from operating system 51 and/or software application 54. The interface 53 in some embodiments can serve to display results, whereupon a user may supply additional inputs or terminate a session. The software application 54 can include a module(s) 52 that can, for example, implement instructions or operations such as those shown in FIGS. 1-3 herein. In one example, module 52 can include, for example, the module(s) 14, 16, 18, 20, and 22 depicted in FIG. 1.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

FIGS. 4-5 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Based on the foregoing, it can be appreciated that preferred and alternative embodiments are disclosed herein. For example, in one embodiment, a system can be implemented for aspect-based sentiment analysis for opinion mining. Such a system can include, for example, a sentiment detection module based on deep syntactic parsing; and machine learning classification components that communicate with the sentiment detection module and which process data provided by the sentiment detection module to determine sentiments expressed with respect to varying aspects of a domain.

In some embodiments, the sentiment detection module can include a syntactic parsing component that detects relevant aspect terms and aspect categories with respect to a domain. In other embodiments, the machine learning classification components can include, for example, a sentence classification module that associates aspect categories to sentences. In still other embodiments, the sentiment detection module can include a sentiment grammar component to associate polarities to aspect terms and aspect categories. In yet other embodiments, the machine learning classification components can include a classification module that associates polarities to aspect categories detected by the sentence classification module.

In another embodiment, the machine learning classification components can also include a polarity correction module that corrects polarities of aspect terms using data indicative of aspect category polarity classification. In yet another embodiment, the sentiment detection module can be provided as a RBS (Rule-Based System) that detects fine-grained information. The RBS can be configured such that if no polarities are associated to an aspect term, the aspect term is associated by default with a neutral polarity.

In another embodiment, a system for aspect-based sentiment analysis for opinion mining can be implemented. Such a system can include, for example, at least one processor and a computer-usable medium embodying computer program code. The computer-usable medium can communicate with the processor(s), the computer program code comprising instructions executable by the processor(s) and configured to, for example: detect via a syntactic parsing module relevant aspect terms and aspect categories with respect to a domain; associate aspect categories to sentences via a sentence classification module; associate via a sentiment grammar component polarities to aspect terms and aspect categories detected by the syntactic parsing module; associate via a classification module polarities to aspect categories detected by the sentence classification module; and correct polarities of aspect terms via a polarity correction module using data indicative of aspect category polarity classification.

In yet another embodiment, a method for aspect-based sentiment analysis for opinion mining can be implemented. Such a method can include, for example, the steps or logical operations of providing a sentiment detection module based on deep syntactic parsing; and configuring machine learning classification components, which communicate with the sentiment detection module and which processes data provided by the sentiment detection module to determine sentiments expressed with respect to varying aspects of a domain.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A system for aspect-based sentiment analysis for opinion mining, said system comprising:
   a sentiment detection module based on deep syntactic parsing; and a plurality of machine learning classification components that communicates with said sentiment detection module and which processes data provided by said sentiment detection module to determine sentiments expressed with respect to varying aspects of a domain.

2. The system of claim 1 wherein said sentiment detection module comprises a syntactic parsing component that detects relevant aspect terms and aspect categories with respect to said domain.

3. The system of claim 2 wherein said plurality of machine learning classification components further comprises a sentence classification module that associates said aspect categories to sentences.

4. The system of claim 3 wherein said sentiment detection module further comprises a sentiment grammar component to associate polarities to aspect terms and said aspect categories.

5. The system of claim 3 wherein said plurality of machine learning classification components further comprises a classification, module that associates polarities to said aspect categories detected by said sentence classification module.

6. The system of claim 1 wherein said plurality of machine learning classification components further comprises a polarity correction module that corrects polarities of aspect terms using data indicative of aspect category polarity classification.

7. The system of claim 6 wherein said sentiment detection module comprises an RBS (Rule-Based System) that detects fine-grained information.

8. The system of claim 3 herein said plurality of machine learning classification components further comprises a polarity correction module that corrects polarities of aspect terms using data indicative of aspect category polarity classification.

9. The system of claim 4 wherein said sentiment detection module comprises an RBS (Rule-Based System) that detects fine-grained information.

10. The system of claim 9 wherein said RBS is configured such that if no polarities are associated to an aspect term, said aspect term is associated by default with a neutral polarity.

11. A system for aspect-based sentiment analysis for opinion mining, said system comprising:
   at least one processor; and
   a non-transitory computer-usable medium embodying computer program code, said computer-usable medium capable of communicating with said at least one processor, said computer program code comprising instructions executable by said at least one processor and configured to:
   detect via a syntactic parsing module relevant aspect terms and aspect categories with respect to a domain;
   associate aspect categories to sentences via a sentence classification module;
   associate via a sentiment grammar component polarities to aspect terms and aspect categories detected by said syntactic parsing module;
   associate via a classification module polarities to aspect categories detected by said sentence classification module; and
   correct polarities of aspect terms via a polarity correction module using data indicative of aspect category polarity classification.

12. A method for aspect-based sentiment analysis for opinion mining, said method comprising:
   providing a sentiment detection module based on deep syntactic parsing; and
   configuring a plurality of machine learning classification components, which communicate with said sentiment detection module and which processes data provided by said sentiment detection module to determine sentiments expressed with respect to varying aspects of a domain.

13. The method of claim 12 further comprising configuring said sentiment detection module to include a syntactic parsing component that detects relevant aspect terms and aspect categories with respect to said domain.

14. The method of claim 13 further comprising configuring said plurality of machine learning classification components to further include a sentence classification module that associates said aspect categories to sentences.

15. The method of claim 14 further comprising configuring said sentiment detection module to further include a sentiment grammar component to associate polarities to aspect terms and said aspect categories.

16. The method of claim 14 further comprising configuring said plurality of machine learning classification components to further include a classification module that associates polarities to said aspect categories detected by said sentence classification module.

17. The method of claim 12 further comprising configuring said plurality of machine learning classification components to further include a polarity correction module that corrects polarities of aspect terms using data indicative of aspect category polarity classification.

18. The method of claim 13 further comprising configuring said sentiment detection module to include an RBS (Rule-Based System) that detects fine-grained information.

19. The method of claim 14 further comprising configuring said plurality of machine learning classification components to further include a polarity correction module that corrects polarities of aspect terms using data indicative of aspect category polarity classification.

20. The method of claim 15 further comprising:
   configuring said sentiment detection module to further include an RBS (Rule-Based System) that detects fine-grained information, wherein said RBS is configured such that if no polarities are associated to an aspect term, said aspect term is associated by default with a neutral polarity.

* * * * *